March 4, 1947.  A. A. GRIFFITH  2,416,991
SUCTION PUMP OPERATING MEANS FOR REMOVING BOUNDARY
LAYER FROM AIRPLANE WINGS
Filed Aug. 12, 1943
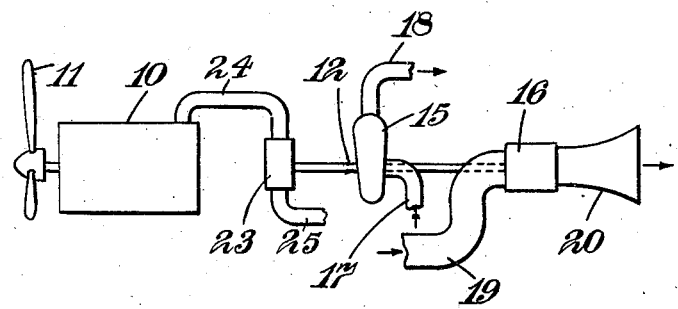
INVENTOR
Alan Arnold Griffith
BY Loyd Hall Sutton
ATTORNEY Patented Mar. 4, 1947

2,416,991

UNITED STATES PATENT OFFICE 2,416,991

SUCTION PUMP OPERATING MEANS FOR REMOVING BOUNDARY LAYER FROM AIRPLANE WINGS

Alan Arnold Griffith, Derby, England, assignor to Rolls-Royce Limited, Derby, England, a British company Application August 12, 1943, Serial No. 498,415
In Great Britain September 10, 1942

2 Claims. (Cl. 244—40)

This invention relates to aerofoils or other surfaces on aircraft which are provided with suction slots or the like for sucking away the boundary layer, and has for its object to provide an improved means for the operation of the suction pump. It has heretofore been proposed to drive a suction pump, fan or equivalent device from the main or auxiliary power-plant of the aircraft, but this has the disadvantage that adequate suction is not available when the engine is idling or in the event of the stopping of the engine through exhaustion of fuel or any other failure. It has also been proposed to drive the pump by means of a turbine or air-motor operated by an airstream derived from the forward motion of the aircraft. In this case, however, the suction is inadequate at low speeds of the aircraft, as for example, during take-off.

According to this invention, there is provided in or for an aircraft having a suction pump to remove the boundary layer from the planes and/or other surfaces, means for driving the pump comprising an exhaust turbine driven by the exhaust from an engine of the aircraft and driving the pump while permitting the pump to overrun the engine, and also a driving connection from an air-motor driven by the relative wind due to the motion of the aircraft.

The drive from the engine is preferably arranged to operate the pump at a higher speed than the drive from the air-motor, so that the operation of the pump at a suitable speed is effectively ensured under all conditions in which it is required to be in operation.

According to yet another feature of this invention, the wind-motor may be adapted to operate as a compressor when the suction pump is driven or tends to be driven at a higher speed than it would be driven by the relative wind due to the speed of the aircraft. In this way any surplus power from the engine-drive is operative to increase the speed of the airstream from the forwardly-directed air intake and to eject it rearwardly, thereby aiding in the propulsion of the aircraft.

An embodiment of the present invention will now be described by way of example only, with reference to the single figure of the accompanying drawing, which shows, diagrammatically, an arrangement in accordance with the invention.

As shown in the single figure of the drawing, an aircraft is propelled by one or more engines 10 driving propellers 11 in the usual manner. This engine, or at least one of them in a multi-engined aircraft, drives a shaft 12 through an exhaust turbine 23 driven by the exhaust gases of the engine which are conveyed to the intake of the exhaust turbine through an exhaust pipe 24 and escape through a rearwardly directed outlet 25. The rotor of a suction pump or fan 15 and the rotor of an air turbine 16 are both secured on the shaft 12. The intake 17 of the suction pump 15 is connected through suitable conduits (not shown) to slots or the like in the planes or other surfaces of the aircraft from which it is desired to suck away the boundary layer. The delivery 18 from the suction pump opens rearwardly of the aircraft. Air for operating the air turbine 16 is supplied through a conduit 19 which opens forwardly of the aircraft and is discharged to the rear through an outlet 20. The turbine 16 is so designed that it will operate as a compressor when the ratio of the angular speed of its rotor to the axial velocity of the air flow through it exceeds a predetermined value and this may be done by making its blades with little or no camber so that they are capable of acting as compressor blades with a suitable relation of axial to peripheral velocity.

The arrangement is such that when the engine or engines are propelling the aircraft at normal cruising speeds, the engine 10 tends to drive the exhaust turbine 23 at a higher speed than does the turbine 16. Under these conditions, the exhaust turbine 23 drives both the pump 15 and the turbine 16. The pump 15 is thus operated to suck off the boundary layer while the turbine 16 operates as a compressor to draw air in through the conduit 19, compress it and discharge it rearwardly as a jet through the outlet 20 to assist in the propulsion of the aircraft. The unit will operate in a similar manner if the air-speed of the aircraft is low while the engines are operating at speed, as is the case when the aircraft is taking off. When the aircraft is in flight with the engine or engines throttled down or stopped, the turbine 16 will drive the suction pump 15 and the exhaust turbine 23 will run idly so that the pump 15 will still be in operation to suck off the boundary layer. Thus, the arrangement provides for the suction pump 15 being in operation in any condition of flight or take off of the aircraft.

This arrangement is particularly applicable to aircraft in which the propulsive effort of the main engine or engines is assisted by a thrust augmentor which comprises a turbine driven by the exhaust gases and coupled to a compressor, usually of the axial type, which takes air in from a forwardly directed intake and delivers it through a rearwardly directed jet-outlet as a jet which assists the propulsion of the aircraft. This arrangement improves the efficiency of the propulsion plant by utilising some of the energy of the exhaust gases. The present invention can be incorporated in such a thrust augmentor by coupling the suction pump 15 to the exhaust turbine of the augmentor as shown in Figure 3 where 23 is the turbine and 16 is the compressor which is so designed that it will act as a turbine when the aircraft has flying speed and the engines are throttled down or stopped.

I claim:

1. In an aircraft having a conduit through which the boundary layer on an external surface is to be sucked, the combination with a propelling engine of the aircraft and a propelling means actuated by the engine for propelling the aircraft, of a suction pump for sucking air through the said conduit, an exhaust turbine coupled to the pump to drive it and having its intake connected to an exhaust pipe from the engine, an air motor adapted to be driven by the relative wind due to motion of the aircraft independently of said propelling means and a driving connection from the air motor to the pump.

2. In an aircraft having a conduit through which a boundary layer on an external surface of the aircraft is to be sucked, the combination with an engine for propelling the aircraft, and a propelling means actuated by the engine for propelling the aircraft, of an air-compressor also adapted to operate solely as an air-turbine, an exhaust turbine driven by the exhaust gases of the engine and coupled to the air-compressor to drive it, a forwardly directed air intake and rearwardly directed air outlet for the compressor and a suction pump adapted to suck air through said conduit and coupled to the exhaust turbine and the air compressor to be driven by one or the other of them.

ALAN ARNOLD GRIFFITH.

REFERENCES CITED

The following references are of record in the file of this patent:

UNITED STATES PATENTS

| Number | Name | Date |
|---|---|---|
| 1,913,644 | Stalker | June 13, 1933 |
| 2,252,528 | Sikorsky et al. | Aug. 12, 1941 |
| 2,041,792 | Stalker | May 26, 1936 |